US012752291B2

(12) United States Patent
Ding

(10) Patent No.: US 12,752,291 B2
(45) Date of Patent: Oct. 6, 2026

(54) PUMPING DEVICE

(71) Applicant: TIANZHOU MEDICAL (SUZHOU) CO., LTD, Suzhou City (CN)

(72) Inventor: Yaowu Ding, Taixing (CN)

(73) Assignee: TIANZHOU MEDICAL (SUZHOU) CO., LTD (CN)

( * ) Notice: Subject to any disclaimer, the term of this patent is extended or adjusted under 35 U.S.C. 154(b) by 88 days.

(21) Appl. No.: 18/854,900

(22) PCT Filed: Jul. 6, 2022

(86) PCT No.: PCT/CN2022/104085
§ 371 (c)(1),
(2) Date: Oct. 7, 2024

(87) PCT Pub. No.: WO2023/193358
PCT Pub. Date: Oct. 12, 2023

(65) Prior Publication Data

US 2025/0353026 A1 Nov. 20, 2025

(30) Foreign Application Priority Data

Apr. 8, 2022 (CN) ......................... 202210369508.3

(51) Int. Cl.
*B05B 11/10* (2023.01)
*F03G 7/00* (2006.01)
*F04B 43/00* (2006.01)

(52) U.S. Cl.
CPC ............ *B05B 11/10* (2023.01); *F03G 7/0254* (2021.08); *F04B 43/0009* (2013.01)

(58) Field of Classification Search
CPC . B05B 11/10; B05B 11/1032; B05B 11/1033; B05B 11/1067; B05B 11/1035;
(Continued)

(56) References Cited

U.S. PATENT DOCUMENTS 3,191,513 A * 6/1965 Turner ................ G03B 17/045 29/454
5,924,603 A * 7/1999 Santagiuliana ..... B05B 11/0005 222/336
(Continued)

FOREIGN PATENT DOCUMENTS

CN 102452524 A 5/2012
CN 112849726 A 5/2021
(Continued)

OTHER PUBLICATIONS

International Search Report with English language translation and Written Opinion dated Aug. 30, 2022 for corresponding International Application No. PCT/CN2022/104085, International Filing Date: Jul. 6, 2022 consisting of 9 pages.

*Primary Examiner* — Ishal Pancholi
(74) *Attorney, Agent, or Firm* — Weisberg I.P. Law, P.A.

(57) ABSTRACT

A pumping device, comprising an actuator and a closure, the actuator being connected to the actuator. The pumping device further comprises a collapsible bladder, the collapsible bladder being formed by connecting a plurality of segments, and an included angle being formed between two adjacent segments, wherein at least two adjacent segments are connected to each other by means of a weakened portion.

9 Claims, 4 Drawing Sheets

(58) Field of Classification Search
CPC ............ B05B 11/1077; B05B 11/1047; B65D 47/2018; F03G 7/0254; F04B 43/0009
See application file for complete search history.

(56) References Cited

U.S. PATENT DOCUMENTS

| | | | | |
|---|---|---|---|---|
| 6,755,327 | B1 * | 6/2004 | Hazard | B05B 11/1059 222/321.7 |
| 2004/0149777 | A1 * | 8/2004 | Santagiuliana | B05B 11/1008 222/190 |
| 2015/0136810 | A1 * | 5/2015 | Ding | B05B 11/1001 222/321.9 |
| 2017/0326567 | A1 * | 11/2017 | Santagiuliana | B05B 11/1001 |
| 2022/0331824 | A1 * | 10/2022 | Andrew | F16F 9/0418 |
| 2023/0034207 | A1 * | 2/2023 | Zandonà | F04B 43/0009 |
| 2023/0311144 | A1 * | 10/2023 | Knight | B05B 11/1074 |
| 2024/0084790 | A1 * | 3/2024 | Byeon | F04B 9/14 |

FOREIGN PATENT DOCUMENTS

| | | | |
|---|---|---|---|
| DE | 202020004925 | U1 | 1/2021 |
| EP | 0463426 | A1 | 1/1992 |
| JP | 2003251712 | A | 9/2003 |

* cited by examiner

PUMPING DEVICE

CROSS-REFERENCE TO RELATED APPLICATIONS

This application is a Submission Under 35 U.S.C. § 371 for U.S. National Stage Patent Application of International Application No.: PCT/CN2022/104085, filed Jul. 6, 2022 entitled "PUMPING DEVICE," which claims priority to Chinese Patent Application No.: CN202210369508.3, filed Apr. 8, 2022, the entireties of both of which are incorporated herein by reference.

TECHNICAL FIELD

The present invention relates to a pumping device for pumping a product in the form of a fluid or semi-fluid from a container, and in particular to an all-plastic pump.

BACKGROUND ART

Pumping devices such as press pumps are widely used in the fields of daily chemical cleaning products, skin care products, food products, pharmaceuticals, etc., to pump out the products contained in containers for use.

Generally, an elastic restoring means such as a metal spring is arranged in the pumping device, such that the pumping device can be restored for next pumping after pressed to pump the product. With the improvement of the environmental requirements of relevant laws and regulations, bladder-type all-plastic pumps have emerged on the market. In the bladder-type all-plastic pump, a conventional metal spring is replaced by a compressible bladder, and the pumping device is restored by using an elastic force generated after the bladder is compressed. The full plasticization of the press pump is embodied by the bladder-type all-plastic pump, so that the press pump can be easily recovered and recycled.

In an application process, it was found that the conventional bladder-type all-plastic pumps have the common problem of hard pressing and has unsatisfactory resilience and restoring performances. This is prone to cause the phenomenon that the press pumps cannot be restored normally for use before the products in containers are used up. After researches, the applicant has found that this problem is mainly caused by the less high conversion rate of a pressing force due to a structural factor of the bladder, with only a small part of the pressing force being converted into a vertically upward resilience force of the bladder, while a considerable part of the remaining pressing force being converted into a radial pulling force of the bladder used during collapsing.

Therefore, there is a need to further improve the bladder-type all-plastic pumps in order to overcome the above-mentioned problem of the conventional bladder-type all-plastic pumps.

SUMMARY OF THE INVENTION

The present invention is provided to solve the above-mentioned problem existing in the prior art. An objective of the present invention is to provide a structurally improved pumping device, and in particular to a bladder-type press pump, which can decrease a pressing force required for pressing a bladder to collapse, and can efficiently convert the pressing force into an upward resilience force. Further, the pumping device further has good resilience performance.

The pumping device disclosed in the present application is configured to pump a product from a container. The pumping device comprises an actuator and a closure, the actuator being connected to the closure. The pumping device further comprises a collapsible bladder, the collapsible bladder being formed by connecting a plurality of segments, an included angle being formed between two adjacent segments, the collapsible bladder being configured such that the adjacent collapsible bladder is collapsed when a pressing force is applied directly or indirectly to the collapsible bladder, and the collapsible bladder is stretched when the pressing force is removed, wherein at least two adjacent segments are connected to each other by means of a weakened portion.

By configuring a portion connected between two segments as a weakened portion, the pressing force required for pressing the collapsible bladder to collapse is smaller, and the loss of the pressing force due to a radial pulling force can also be reduced or avoided, so that it is also easier to restore the collapsible bladder when the pressing force is removed.

In a preferred structure, the collapsible bladder is located in a space formed by cooperation of the actuator and the closure. In this case, an upper end of the collapsible bladder is supported on the actuator, a lower end of the collapsible bladder is supported on the closure, and the actuator is relatively movably connected to the closure, such that the collapsible bladder can be collapsed by pressing the actuator.

In an alternative structure, the collapsible bladder is formed at the top of the actuator, the actuator is fixedly connected to the closure, and the collapsible bladder may be collapsed by directly applying the pressing force to the collapsible bladder.

Preferably, the weakened portion may be formed into at least one of the following structures:

- an outer notch portion opened toward an outer side of the included angle;
- an inner notch portion opened toward an inner side of the included angle; and
- a thin-walled portion.

Preferably, the Bladder-Type Press Pump May Further Comprise:

- an upper one-way valve formed between an internal space of the bladder and an outlet of the actuator; and/or
- a lower one-way valve formed between the internal space of the bladder and the container.

The upper one-way valve is formed by mutual cooperation of a flange of an upper portion of the collapsible bladder and an inner sleeve of the actuator; and the lower one-way valve may comprise a valve plate formed at a lower portion of the collapsible bladder, the valve plate cooperating with a valve seat formed in the closure. Of course, the upper one-way valve and the lower one-way valve may also be in other forms. For example, the lower one-way valve may be a ball-type one-way valve, where a ball is located in the valve seat formed on the closure.

The collapsible bladder may have various suitable shapes. For example, a longitudinal cross section of the collapsible bladder is in one of a trapezoidal shape and a cylindrical shape, and a transverse cross section of the collapsible bladder is in one of a circular shape, a rectangular shape and a polygonal shape.

Preferably, the collapsible bladder is formed in a spiral shape. The spiral shape of the collapsible bladder facilitates spiral demolding in the manufacture process of the collapsible bladder.

Preferably, the collapsible bladder is configured such that when the collapsible bladder is pressed, the segments are not deformed, and only the weakened portion between two adjacent segments is deformed. In this way, the loss of the pressing force caused by the inelastic deformation of the collapsible bladder can be reduced as much as possible, and thus the efficiency of converting the pressing force into a resilience force is improved.

The collapsible bladder can be returned to an original shape thereof by means of the resilience force thereof. Alternatively, the resilience force of the collapsible bladder that is generated during pressing may be less than a force required for restoring the collapsible bladder, or the collapsible bladder itself may even not have the capability to generate a resilience force. In this case, an elastic restoring mechanism may additionally be arranged in the internal space of the collapsible bladder, with an upper end of the elastic restoring mechanism being supported on the actuator or the top of the collapsible bladder, and a lower end of the elastic restoring mechanism being supported on one of the closure, the actuator and the lower portion of the collapsible bladder.

For example, the upper end of the elastic restoring mechanism is supported on the actuator, and the lower end is supported on the closure; or the upper end is supported on the actuator, and the lower end is supported on the lower portion of the collapsible bladder; or the upper end is supported on the top of the collapsible bladder, and the lower end is supported on one of the actuator, the closure or the lower portion of the collapsible bladder, and so on.

Preferably, the elastic restoring mechanism comprises at least one arcuate elastic strip. The elastic strip may be made of plastics.

Of course, the elastic restoring mechanism may also be in other forms. For example, the elastic restoring mechanism may also in a spiral shape, a mesh shape, an S shape, a prismatic shape, a combination thereof, etc. In addition, the elastic restoring mechanism may also be configured in various spring forms, such as a compression spring, a tension spring, or a leaf spring.

BRIEF DESCRIPTION OF THE DRAWINGS

Specific implementations of the present invention will become more clearly understood from the structures shown in the accompanying drawings, in which.

DETAILED DESCRIPTION OF EMBODIMENTS

Figure 1:
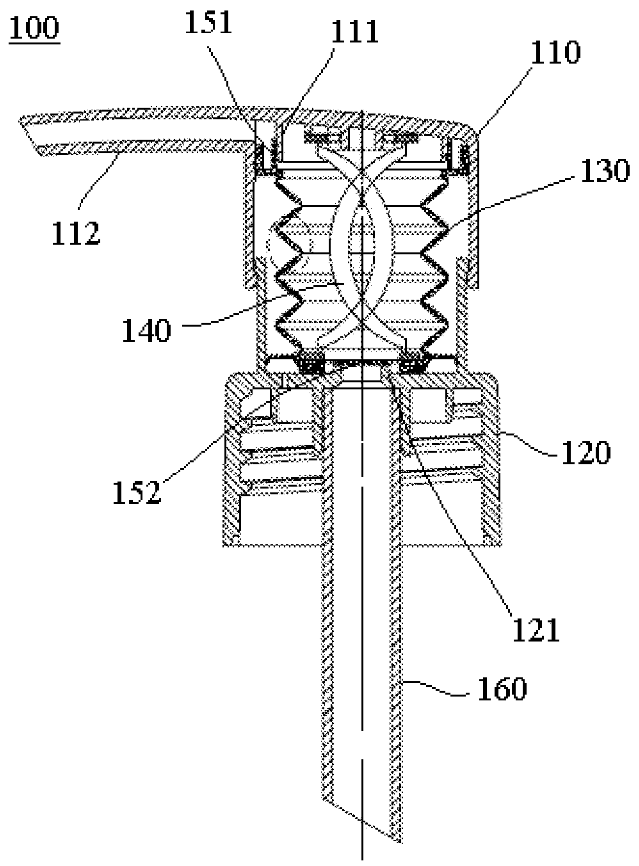
FIG. 1 shows a cross-sectional view of a bladder-type press pump according to a first embodiment of the present invention, with the bladder-type press pump in an upper standby position thereof.

In order to facilitate the understanding of the present utility model, specific implementations of a pumping device of the present invention will be described in detail with reference to the accompanying drawings. It should be understood that only preferred embodiments of the present invention are shown in the drawings and are not construed as a limitation to the scope of the present invention. Various obvious modifications, variations and equivalent substitutions of the present invention can be made by those skilled in the art on the basis of the embodiments shown in the drawings, and the technical features in the various embodiments described below can be arbitrarily combined with each other without causing contradictions. These all fall within the scope of the present invention.

In the following detailed description of the present invention, the terms, such as "upper" and "lower", used for indicating directions and orientations are based on the typical orientation of a pumping device shown in the drawings in a use state, and it can be understood that the orientation of the press pump may change during transportation, storage, etc.

First Embodiment

FIGS. 1-8 show a first embodiment of the pumping device of the present invention and variant structures thereof. Specifically, the pumping device is a bladder-type press pump 100.

Figure 2:
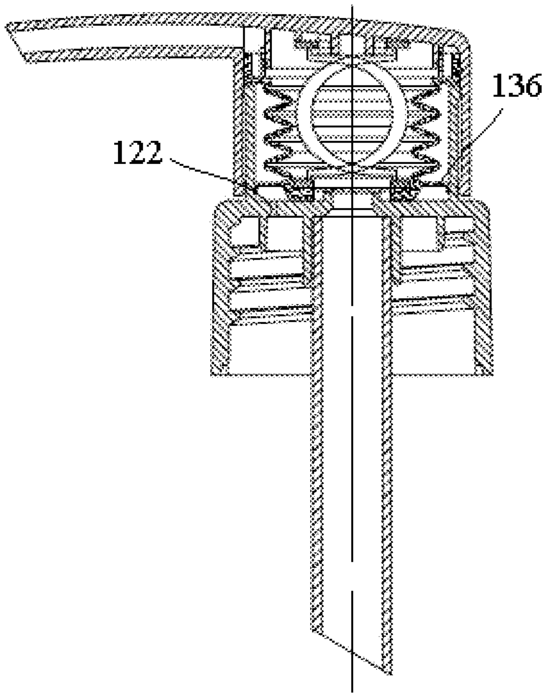
FIG. 2 shows another cross-sectional view of the bladder-type press pump in FIG. 1, with the bladder-type press pump in a lower pressing position thereof.

FIGS. 1 and 2 show cross-sectional views of the bladder-type press pump 100 of the first embodiment. FIG. 1 shows the bladder-type press pump 100 in an upper dead center of a stroke, and FIG. 2 shows the bladder-type press pump 100 which is pressed down to be in a lower dead center of the stroke.

The bladder-type press pump 100 comprises an actuator 110 and a closure 120. The actuator 110 and the closure 120 cooperate with each other to form an accommodating space in which a collapsible bladder 130 is accommodated. An upper end of the collapsible bladder 130 cooperates with the top of the actuator 110, for example, is fixed to the top of the actuator 110. The upper end of the collapsible bladder 130 is provided with a flange 135 (as seen more clearly in FIG. 3). The top of the actuator 110 overhangs downwardly to form an inner sleeve 111. The flange 135 of the collapsible bladder 130 cooperates with the inner sleeve 111 of the actuator 110 to form an upper one-way valve 151. The upper one-way valve 151 is arranged between an internal space of the collapsible bladder 130 and a pressure nozzle 112 of the actuator 110, and is configured to allow a product contained in the collapsible bladder 130 to flow out, but prevent air, impurities or the like outside the bladder from flowing into the collapsible bladder 130.

A lower end of the collapsible bladder 130 is supported on the closure 120. In addition, a valve plate is integrally provided at the lower end of the collapsible bladder 130 to form a lower one-way valve 152. Correspondingly, a valve seat 121 cooperating with the valve plate is formed on the collapsible bladder 130. The lower one-way valve 152 is configured to allow the product inside a container (not shown) provided with the bladder-type press pump 100 to enter the internal space of the collapsible bladder 130 through a suction tube 160, but prevent the product contained in the collapsible bladder 130 from flowing back to the container.

In a preferred structure, as shown clearly in FIGS. 1 and 2, an elastic restoring mechanism 140 is arranged inside the collapsible bladder 130. An upper end of the elastic restoring mechanism 140 is supported under the top of the actuator 110, and a lower end of the elastic restoring mechanism 140 is supported at the lower end of the collapsible bladder 130, or on the closure 120.

Further, the upper end of the elastic restoring mechanism 140 may be fixedly connected to the actuator 110, or may be removably supported to the actuator 110. Similarly, the lower end of the elastic restoring mechanism 140 may also be fixedly connected to the collapsible bladder 130 or the closure 120, or may be removably supported.

A preferred structure of the elastic restoring mechanism 140 is at least one arcuate elastic strip, preferably two or more elastic strips. The elastic strip may be made of plastics.

Figure 3A:
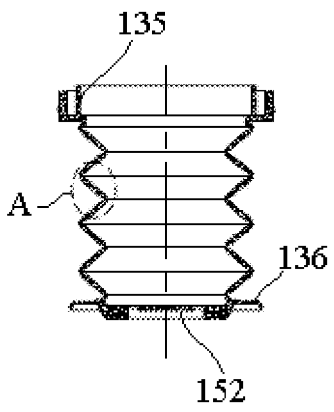
FIG. 3*a* shows a cross-sectional view of an exemplary structure of a collapsible bladder of the bladder-type press pump in FIG. 1.
Figure 3B:
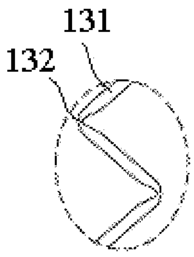
FIG. 3*b* is an enlarged view of part A in FIG. 3*a*.

FIG. 3*a* shows an exemplary structure of the collapsible bladder 130 in the bladder-type press pump 100, and FIG. 3*b* shows an enlarged view of part A in FIG. 3*a*. As mentioned above, the upper end of the collapsible bladder 130 is provided with the flange 135 which cooperates with the inner sleeve 111 of the actuator 110 to form the upper one-way valve 151, and the lower end of the collapsible bladder 130 is integrally formed with the lower one-way valve 152 in the form of the valve plate.

A main body of the collapsible bladder 130 is formed by connecting a plurality of segments 131, and an included angle α is formed between two adjacent segments 131. It can be seen from the figures that the included angle α is typically an angle less than 180 degrees. As schematically shown in the figures, the segments 131 may be straight. Alternatively, the straight segments 131 may be slightly arc-shaped. Moreover, a weakened portion is formed between two adjacent segments 131. It can be more clearly seen from FIG. 3*b* that, in this exemplary structure, the weakened portion connected between two adjacent segments 131 is specifically in the form of an inner notch portion 132. The term "inner notch portion" herein means that the notch portion is formed as an inner opening facing the included angle α formed by the adjacent segments 131. For example, the inner notch portion 132 may be a V-shaped notch.

Preferably, the segments 131 of the collapsible bladder 130 may be made of a relatively rigid material, such that when the collapsible bladder 130 is pressed, the segments 131 themselves are not deformed or are only slightly deformed, and only the inner notch portion 132 between the adjacent two segments 131 is deformed. In this way, the loss of the pressing force can be reduced as much as possible, so that the efficiency of converting the pressing force into a resilience force can be improved.

Moreover, in the structure of the collapsible bladder 130 shown in the figures, it is preferable that when the collapsible bladder 130 is pressed, a bisector of the included angle α between the two adjacent segments 131 remains horizontal substantially, and the segments 131 are pivoted in the range of the bisector. In this way, it is ensured that the collapsible bladder 130 is collapsed and stretched in a vertical direction shown in the figures.

Therefore, the structure of the present application may have an effect of directional collapse. The effect of directional collapse is mainly implemented by, for example, the weakened portion of the inner notch portion 132.

Figure 4A:
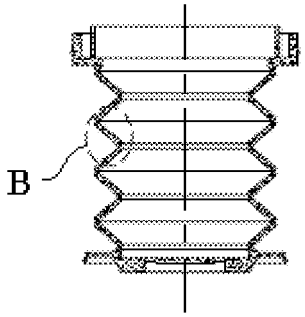
FIG. 4*a* shows a cross-sectional view of another exemplary structure of the collapsible bladder of the bladder-type press pump in FIG. 1.
Figure 4B:
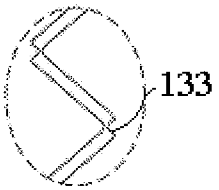
FIG. 4*b* is an enlarged view of part B of FIG. 4*a*.

In addition to the structure shown in FIGS. 3*a* and 3*b*, the weakened portion of the collapsible bladder 130 may also be in other forms. For example, in the structure shown in FIGS. 4*a* and 4*b*, the weakened portion formed between two adjacent segments 131 is in the form of an outer notch portion 133. The term "outer notch portion" herein means that the notch portion is formed as an outer opening facing the included angle α formed by the adjacent segments 131, as schematically shown in FIG. 4*b*.

Figure 5A:
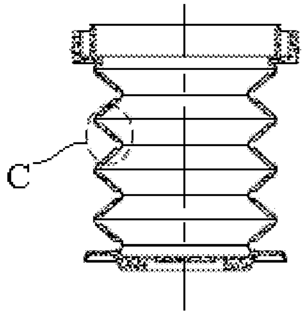
FIG. 5*a* shows a cross-sectional view of a further exemplary structure of the collapsible bladder of the bladder-type press pump in FIG. 1.
Figure 5B:
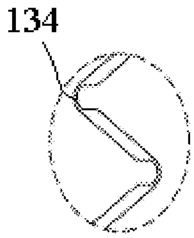
FIG. 5*b* is an enlarged view of part C in FIG. 5*a*.

For another example, in another alternative structure shown in FIGS. 5*a* and 5*b*, the weakened portion connected between two adjacent segments 131 is designed to be in the form of a thin-walled portion 134.

Preferably, as shown in the figures, a sealing sleeve 136 is formed at a lower portion of the collapsible bladder 130, and the sealing sleeve 136 cooperates with the closure 120 to form a seal. As shown in FIG. 1, a balance air hole 122 is preferably formed in the closure 120. When the bladder-type press pump 100 is in a lower actuator-locking position, for example, during storage and transportation, the sealing sleeve 136 closes the balance air hole 122 (FIG. 2). When the bladder-type press pump 100 is in a use position, for example, an upper standby position shown in FIG. 1, the balance air hole 122 is opened such that ambient air can be sucked into the container through the balance air hole 122. In this way, the balance of internal and external air pressures of the container can be maintained after the product is pumped out of the container.

The collapsible bladder 130 with the above-mentioned structure may be made of various suitable plastic materials available, for example, a soft plastic or a hard plastic. With the structure mentioned above, the collapsible bladder 130 may generate a resilience force during pressing. However, the collapsible bladder 130 may alternatively be made of a plastic material that does not generate a resilience force or generates a very small resilience force. In this case, the bladder-type press pump 100 is restored basically by means of the resilience force of the elastic restoring mechanism 140.

The collapsible bladder 130 may alternatively be formed in various ways known in the prior art, for example, injection molding, blow molding, injection blowing, gas-assisted injection molding, etc.

Figure 6:
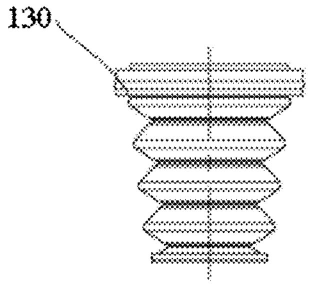
FIG. 6 is a side view of a collapsible bladder with a variant structure.
Figure 7:
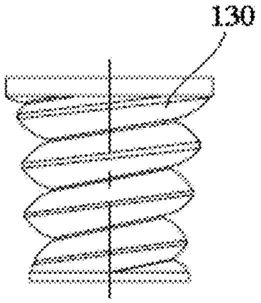
FIG. 7 is a side view of a collapsible bladder with another variant structure.
Figure 8:
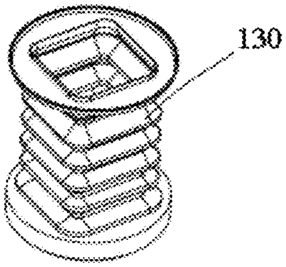
FIG. 8 is a perspective view of a collapsible bladder with a further variant structure.

FIGS. 6-8 show the collapsible bladders 130 with various structures. Different from the substantially cylindrical collapsible bladder 130 shown in FIGS. 3*a*-5*b*, a longitudinal cross section of the collapsible bladder 130 shown in FIG. 6 is substantially trapezoidal.

The collapsible bladder 130 shown in FIG. 7 is in a spiral shape. The spiral collapsible bladder 130 facilitates the manufacture of the collapsible bladder 130, and particularly can facilitate spiral demolding in the manufacture process.

A transverse cross section of the collapsible bladder 130 may also have various suitable shapes, for example, a circular shape, or a square cross section as shown in FIG. 8, or a rectangular shape, a polygonal shape, etc.

The elastic restoring mechanism 140 may be made of a suitable plastic material and may have various shapes according to actual demands, for example, an arcuate shape, a spiral shape, a mesh shape, an S shape, a prismatic shape, a combination thereof, etc.

In addition, the elastic restoring mechanism 140 may also be configured in various spring forms, such as a compression spring, a tension spring, or a leaf spring.

An operation principle of the bladder-type press pump 100 described above will be explained below.

During use, a user presses down the actuator 110 so as to press down the collapsible bladder 130 and the elastic restoring mechanism 140 simultaneously. In this case, the collapsible bladder 130 is collapsed downwardly, the included angle α between the adjacent segments 131 becomes smaller, an available space in the collapsible bladder 130 becomes smaller, a pressure inside the collapsible bladder 130 then rises, the upper one-way valve 151 is opened, and thus the product is pumped out. Moreover, during the downward pressing, a resilience force is accumulated in the collapsible bladder 130 and the elastic restoring mechanism 140. When the user removes the pressure applied to the actuator 110, the collapsible bladder 130 and the elastic restoring mechanism 140 are restored upwardly under the action of the resilience force thereof, and in this process, the collapsible bladder 130 is stretched upwardly with the included angle α between two adjacent segments 131 becoming larger. In this way, the available space in the collapsible bladder 130 is increased such that the pressure inside the collapsible bladder 130 drops, which causes the lower one-way valve 152 to be opened, and thus the product in the container flows into the internal space of the collapsible bladder 130 to be pressed for use next time.

In the above-mentioned structure of the bladder-type press pump 100, the collapsible bladder 130 can be easily collapsed and stretched by means of the weakened portion formed between two adjacent segments 131. When the pressing force is applied downwardly, the pressing force required for collapsing the collapsible bladder 130 is decreased.

Second Embodiment

Figure 9:
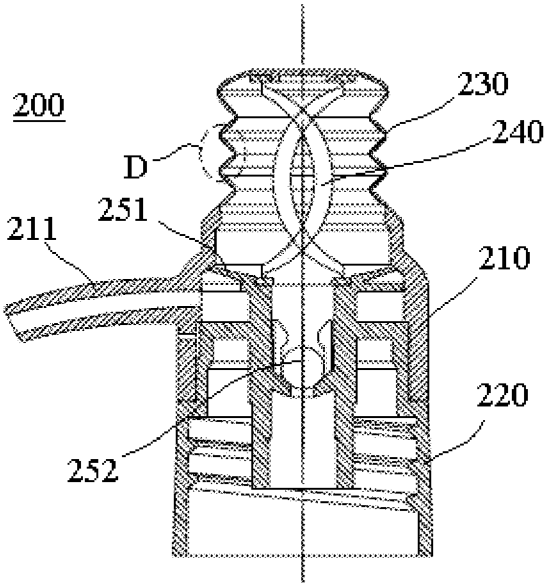
FIG. 9 shows a cross-sectional view of a bladder-type press pump according to a second embodiment of the present invention.
Figure 10:
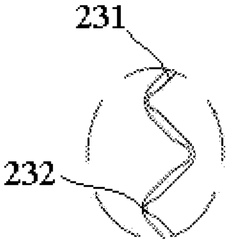
FIG. 10 is an enlarged view of part D in FIG. 9.

FIGS. 9 and 10 show a bladder-type press pump 200 according to a second embodiment of the present invention. The above specific structure described in the first embodiment is also applicable to the second embodiment unless otherwise described or conflicting. A structure of the second embodiment different from that of the first embodiment will be mainly described below.

As shown in FIG. 9, the bladder-type press pump 200 comprises an actuator 210 and a closure 220. The actuator 210 is connected to the closure 220. The difference from the first embodiment lies in that the actuator 210 is fixedly connected to the closure 220 together, while the actuator 110 in the first embodiment can move relative to the closure 120 in an up-down direction.

A collapsible bladder 230 is arranged at the top of the actuator 210. The collapsible bladder 230 is fixedly connected to the actuator 210. For example, the collapsible bladder 230 may be integrally formed on the actuator 210, or the collapsible bladder 230 may be separately formed and then fixedly connected to the actuator 210 by means of a method known in the prior art, for example, hot melting.

An elastic restoring mechanism 240 is accommodated in the collapsible bladder 230. An upper end of the elastic restoring mechanism 240 is supported to the top of the collapsible bladder 230, and a lower end of the elastic restoring mechanism 240 is supported to the closure 220. Alternatively, the lower end of the elastic restoring mechanism 240 may be supported on the actuator 210 or the lower portion of the collapsible bladder 230, which falls within the scope of the present application.

An upper one-way valve 251 is formed between an internal space of the collapsible bladder 230 and a pressure nozzle 211 of the actuator 210, to allow a product inside the collapsible bladder 230 to be dispensed through the pressure nozzle 211 but prevent the product from flowing back to the collapsible bladder 230. Similar to the first embodiment, the upper one-way valve 251 may be in the form of a flexible flange.

FIG. 10 shows an enlarged view of part d in FIG. 9, in which a partial structure of the collapsible bladder 230 is illustrated. The collapsible bladder 230 comprises a plurality of interconnected segments 231. Two adjacent segments 231 are connected together by means of a weakened portion 232. The weakened portion 232 may be the notch portion or the thin-walled portion as mentioned in the first embodiment. In this way, the collapsible bladder 230 is prone to deformation, so that a force required for collapsing and stretching the collapsible bladder 230 is smaller.

A lower one-way valve 252 is arranged in the closure 220, and the lower one-way valve 252 is in the form of a ball. Of course, the lower one-way valve 252 may also be in the form of a valve plate, like the lower one-way valve 152 in the first embodiment.

During use, an operator directly applies a pressing force to the top of the collapsible bladder 230, such that the collapsible bladder 230 is collapsed downwardly, and the elastic restoring mechanism 240 is bent and deformed. When the pressing force is removed, a resilience force of the elastic restoring mechanism 240 causes the collapsible bladder 230 to return to a state before the collapsible bladder is pressed. Of course, the collapsible bladder 230 may also have a certain resilience force itself, to enable the bladder to return to a non-pressed state.

The invention claimed is:

1. A pumping device for pumping a product from a container, the pumping device comprising an actuator and a closure, the actuator being connected to the closure, the pumping device further comprises a collapsible bladder, the collapsible bladder being formed by connecting a plurality of segments, an included angle being formed between two adjacent segments, the collapsible bladder being configured such that the collapsible bladder is collapsed when a pressing force is applied directly or indirectly to the collapsible bladder, and the collapsible bladder is stretched when the pressing force is removed, at least two adjacent segments are connected to each other by means of a weakened portion, such that the resilience force of the collapsible bladder that is generated during pressing is less than a force required for restoring the collapsible bladder, or the collapsible bladder itself does not have the capability to generate a resilience force;

wherein the weakened portion is in the form of at least one of the following structures: an outer notch portion opened toward an outer side of the included angle, an inner notch portion opened toward an inner side of the included angle, and a thin-walled portion; and wherein an elastic restoring mechanism is arranged in the internal space of the collapsible bladder, with an upper end of the elastic restoring mechanism being supported on the actuator or the top of the collapsible bladder, and a lower end of the elastic restoring mechanism being supported on one of the closure, the actuator and the lower portion of the collapsible bladder.

2. The pumping device of claim 1, wherein an upper end of the collapsible bladder is supported on the actuator, a lower end of the collapsible bladder is supported on the closure, and the actuator is relatively movably connected to the closure, such that the collapsible bladder can be collapsed by pressing the actuator.

3. The pumping device of claim 1, wherein the actuator has a top and a bottom, the collapsible bladder is formed at the top of the actuator, the actuator is fixedly connected to the closure, and the collapsible bladder is collapsed by directly applying the pressing force to the collapsible bladder.

4. The pumping device of claim 1, further comprising:

an upper one-way valve formed between an internal space of the collapsible bladder and an outlet of the actuator; and/or a lower one-way valve formed between the internal space of the collapsible bladder and the container.

5. The pumping device of claim 4, wherein the upper one-way valve is formed by mutual cooperation of a flange of an upper portion of the collapsible bladder and an inner sleeve of the actuator; and the lower one-way valve comprises a valve plate formed at a lower portion of the collapsible bladder, the valve plate cooperating with a valve seat formed in the closure.

6. The pumping device of claim 1, wherein a longitudinal cross section of the collapsible bladder is in one of a trapezoidal shape and a cylindrical shape, and a transverse cross section of the collapsible bladder is in one of a circular shape, a rectangular shape and a polygonal shape.

7. The pumping device of claim 1, wherein the collapsible bladder is formed in a spiral shape.

8. The pumping device of claim 1, wherein the collapsible bladder is configured such that when the collapsible bladder is pressed, the segments are not deformed, and only the weakened portion between two adjacent segments is deformed.

9. The pumping device of claim 1, wherein the elastic restoring mechanism comprises at least one arcuate elastic strip.

* * * * *